E. H. HAMILTON.
ORE REDUCING PROCESS AND FURNACE.
APPLICATION FILED JULY 2, 1919.
1,362,570.  Patented Dec. 14, 1920.
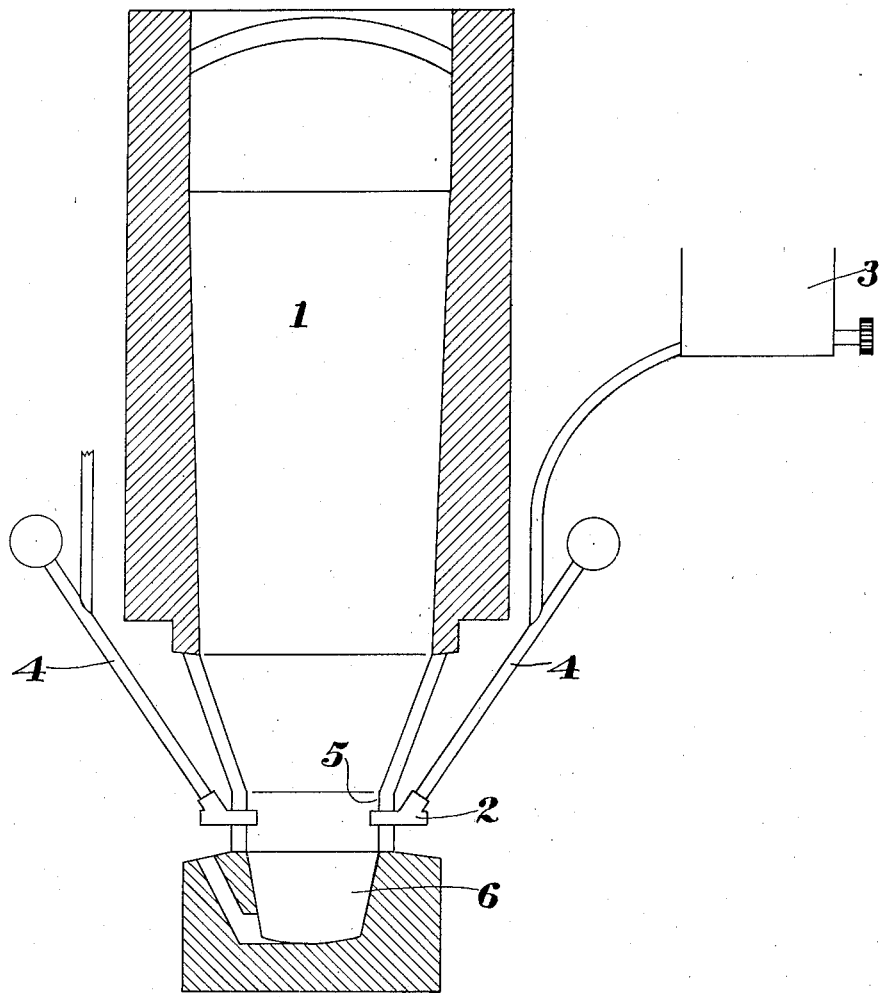

UNITED STATES PATENT OFFICE.

EDWARD H. HAMILTON, OF MIDVALE, UTAH.

ORE-REDUCING PROCESS AND FURNACE.

1,362,570.  Specification of Letters Patent.  Patented Dec. 14, 1920.

Application filed July 2, 1919. Serial No. 308,158.

*To all whom it may concern:*

Be it known that I, EDWARD H. HAMILTON, a citizen of the United States, residing at Midvale, in the county of Salt Lake and State of Utah, have invented certain new and useful Improvements in Ore-Reducing Processes and Furnaces; and I do hereby declare the following to be a full, clear, and exact description of the invention, such as will enable others skilled in the art to which it appertains to make and use the same.

The present invention relates to processes and furnaces for smelting ores and particularly to processes and furnaces for reducing ores, such as lead ores.

It has been proposed to smelt ores in lead blast furnaces by supplying finely divided fuel to the furnaces, along with the air blast, through the twyers. The fuel, after leaving the twyers, has a tendency to creep up along the interior walls of the furnace, establishing channels through which the heated gases may travel along the water jacket and the side walls of the furnace instead of through the ore, and through which a proportion of the fuel may be carried by the blast, unburnt, out of the furnace. Through the channels, too, slag may flow downwardly along the side walls to stop up the twyers. The tendency of the fuel to travel along the walls of the furnace is furthermore particularly objectionable in connection with the smelting of ore by reduction processes. As is well known, excess portions of air must be avoided in such processes, in order to bring about as complete a reduction of the ore as possible. As the fuel and air are previously mixed together in the proper proportions to furnish the necessary heat and still afford a reducing atmosphere at the lower, central portion of the furnace, and as part of the fuel may escape upwardly along the inner wall, an excess portion of air may be supplied to the central portion of the furnace, which may result, not in a reducing atmosphere in that area, but in one that is oxidizing. Much of the ore may thus pass through without being reduced.

The present invention eliminates these objections by introducing the mingled air and fuel into the furnace through twyers which project into the interior of the furnace beyond its inner walls, where the heat is greater and combustion therefore better. The fuel, which may be in powdered or liquid form, is thus utilized in the charge before it can escape, unburnt, out of the furnace, less of the heat is wasted in heating the water in the water jackets, the tendency of the slag to stop up the twyers is minimized, and the presence of a reducing atmosphere is better provided for.

The accompanying drawing is a diagrammatic view of a blast furnace constructed and arranged for the carrying out of the present invention.

As shown the air and fuel is supplied through the twyers 2 which project into the furnace 1 beyond its interior wall. So far as present developments have indicated, the preferred length of interior twyer projection is about six inches, but it is within the scope of the present invention to have a greater or less projection of the twyers. The finely-divided fuel is fed in suitable and regulated proportions from a hopper 3 to the twyer pipe 4, where it meets the incoming blast of air with which it mingles and by which it is carried through the twyer 2 to a point at a substantial distance from the wall 5 of the furnace.

The invention is applicable to the smelting of many ores, but is particularly adapted for ores which requires reducing conditions, such as lead ores. The charge, which varies with the type of ore and which may comprise the ore and a silica, limestone, iron ore, or other suitable flux mixed together in suitable proportions, is introduced at the top of the furnace. Under some conditions, fuel may be added to the charge, but preferably, as much as possible of the fuel should be introduced through the twyers, as the cost of the operation is thereby reduced and the smelting process is carried on to better advantage. The air and the fuel rise uniformly from the twyers 2 through the successive layers of charged material, the fuel burning and heating the contents of the furnace. The flux and the ore melt and fuse together. If the air and the fuel are mixed together in the proper proportions, a reducing atmosphere will result, causing the ore, which may contain lead and other metals associated therewith, like silver and bismuth, to become reduced. The metals will fall through the smelting zone to the well 6 at the bottom of the furnace.

The invention having been thus described, what is claimed is:—

1. The process of smelting ores which comprises introducing into the charge a blast of air and finely divided fuel at a point within the interior wall of the furnace, thereby avoiding the escape of the fuel up the walls of the furnace.

2. The process of smelting ores which comprises introducing into the charge at a point within the interior wall of the furnace a blast of air and finely divided fuel to maintain a reducing atmosphere throughout the smelting zone.

3. A blast furnace having, in combination, a twyer projecting into the interior of the furnace sufficiently to prevent the blast creeping up the wall of the charged furnace, and means for introducing finely divided fuel into the interior of the charge within the furnace with the air blast through the twyer.

EDWARD H. HAMILTON.